United States Patent
Lee et al.

(10) Patent No.: US 10,711,972 B2
(45) Date of Patent: Jul. 14, 2020

(54) BACKLIGHT UNIT AND HOLOGRAPHIC DISPLAY DEVICE INCLUDING THE SAME

(71) Applicant: Samsung Display Co., Ltd., Yongin-si (KR)

(72) Inventors: Hye Sog Lee, Osan-si (KR); Jae Ho You, Gwangmyeong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 34 days.

(21) Appl. No.: 15/604,247

(22) Filed: May 24, 2017

(65) Prior Publication Data
US 2018/0094791 A1    Apr. 5, 2018

(30) Foreign Application Priority Data
Oct. 5, 2016   (KR) .................. 10-2016-0128331

(51) Int. Cl.
*G02B 5/32* (2006.01)
*F21V 5/00* (2018.01)
(Continued)

(52) U.S. Cl.
CPC ............ *F21V 5/00* (2013.01); *G03H 1/2286* (2013.01); *G03H 1/2294* (2013.01); *G02B 5/32* (2013.01);
(Continued)

(58) Field of Classification Search
CPC ...... G03H 1/2294; G03H 1/04; G03H 1/2286; G03H 2210/30; G03H 2222/34;
(Continued)

(56) References Cited

U.S. PATENT DOCUMENTS 5,151,800 A * 9/1992 Upatnieks .......... G02B 27/0944
                                                    359/14
6,490,060 B1 * 12/2002 Tai ...................... G02B 5/32
                                                    359/15
(Continued)

FOREIGN PATENT DOCUMENTS

KR   1020130022082        3/2013
KR   1020140114651        9/2014
(Continued)

OTHER PUBLICATIONS

C.S. Choi et al., "Ultra-slim coherent backlight unit mobile holographic display", Nanoengineering: Fabrication, Properties, Optics, and Devices XII, vol. 9556, (2015), pp. 1-7.
(Continued)

*Primary Examiner* — William R Alexander
*Assistant Examiner* — Balram T Parbadia
(74) *Attorney, Agent, or Firm* — Cantor Colburn LLP (57) ABSTRACT

A backlight unit includes: a light source unit which outputs coherent light; a first reflection unit including a parabolic mirror; a second reflection unit facing the first reflection unit and including a flat mirror; and a holographic optical element which changes a path of incident light, where a reflection surface of the second reflection unit forms an acute angle with an light incident surface of the holographic optical element, and the coherent light output from the light source unit sequentially passes the first reflection unit, the second reflection unit, and the holographic optical element.

15 Claims, 7 Drawing Sheets

(51) Int. Cl.
  *G03H 1/22* (2006.01)
  *G03H 1/04* (2006.01)
  *G02F 1/13357* (2006.01)

(52) U.S. Cl.
  CPC .. *G02F 1/133605* (2013.01); *G02F 1/133615* (2013.01); *G03H 1/04* (2013.01); *G03H 2001/2226* (2013.01); *G03H 2222/12* (2013.01); *G03H 2222/34* (2013.01); *G03H 2222/53* (2013.01); *G03H 2223/16* (2013.01); *G03H 2223/23* (2013.01); *G03H 2223/24* (2013.01)

(58) Field of Classification Search
  CPC ............... G03H 1/0408; G03H 1/22; G03H 2001/2223; G03H 2001/2226; G03H 2222/53; G03H 2223/24; G03H 2227/02; G02B 5/32; G02B 6/0046; G02B 23/14; G02B 27/0944; G02B 27/30; G02B 5/1814; G02B 5/203; G02B 6/0028; G02B 6/0055; F41G 1/34
  See application file for complete search history.

(56) References Cited

U.S. PATENT DOCUMENTS

| | | | |
|---|---|---|---|
| 7,225,578 B2 * | 6/2007 | Tai | F41G 1/30 33/334 |
| 7,660,047 B1 | 2/2010 | Travis et al. | |
| 8,982,438 B2 | 3/2015 | Choi et al. | |
| 9,030,742 B2 * | 5/2015 | Ventola | G02B 5/1814 359/572 |
| 2002/0135996 A1 * | 9/2002 | Suga | G02B 6/0038 362/601 |
| 2005/0201120 A1 * | 9/2005 | Nesterenko | G02B 6/0028 362/609 |
| 2005/0237768 A1 * | 10/2005 | Matsumoto | G02B 6/0036 362/620 |
| 2006/0162226 A1 * | 7/2006 | Tai | F41G 1/30 42/132 |
| 2006/0256578 A1 * | 11/2006 | Yang | G02B 6/0031 362/609 |
| 2011/0044579 A1 | 2/2011 | Travis et al. | |
| 2013/0021821 A1 * | 1/2013 | Yoon | G02F 1/1336 362/612 |
| 2014/0285862 A1 | 9/2014 | Song et al. | |
| 2015/0304642 A1 * | 10/2015 | Kim | G03H 1/2202 348/40 |

FOREIGN PATENT DOCUMENTS

| | | |
|---|---|---|
| KR | 1020160082090 | 7/2016 |
| WO | 0133261 | 5/2001 |

OTHER PUBLICATIONS

W. Hu et al., "Flat-Panel Coherent Backlight for Holographic Displays with Improved Diffraction Efficiency", SID, (2015), pp. 530-533.

Extended European Search Report—European Patent Application No. 17179491.0 dated Feb. 5, 2018, citing references listed within.

* cited by examiner

BACKLIGHT UNIT AND HOLOGRAPHIC DISPLAY DEVICE INCLUDING THE SAME

This application claims priority to Korean Patent Application No. 10-2016-0128331, filed on Oct. 5, 2016, and all the benefits accruing therefrom under 35 U.S.C. § 119, the content of which in its entirety is herein incorporated by reference.

BACKGROUND

(a) Field

The disclosure relates to a backlight unit and a holographic display device including the backlight unit. More particularly, the disclosure relates to a coherent backlight unit with reduced thickness and improved light efficiency, and a holographic display device including the coherent backlight unit.

(b) Description of the Related Art

A technique for recording an interference pattern containing a three-dimensional ("3D") image information to a medium such as a film or an electronic device or a technique generating the 3D image through the film or the electronic device is referred to as holography, and the 3D image reproduced through holography is referred to as a hologram. A reference wave is irradiated to the medium recorded with the 3D image information to display the hologram that is the 3D image for an object. In such a technique, coherent light of which a wavelength is constant and a phase is continuous is used as the reference wave.

SUMMARY

Exemplary embodiments of the disclosure provide a coherent backlight unit with a reduced thickness and improved light efficiency and a holographic display device including this backlight unit, thereby reducing the thickness and improving the efficiency thereof.

According an exemplary embodiment of the invention, a backlight unit includes: a light source unit which outputs coherent light; a first reflection unit including a parabolic mirror; a second reflection unit facing the first reflection unit and including a flat mirror; and a holographic optical element which changes a path of incident light, where a reflection surface of the second reflection unit forms an acute angle with an light incident surface of the holographic optical element, and the coherent light output from the light source unit sequentially passes the first reflection unit, the second reflection unit, and the holographic optical element.

In an exemplary embodiment, the light source unit may be positioned at a focal point of the parabolic mirror of the first reflection unit.

In an exemplary embodiment, the light source unit may include: a coherent light source; or an incoherent light source and a pinhole part positioned before an output part of the incoherent light source.

In an exemplary embodiment, the incoherent light source may include a light emitting diode ("LED").

In an exemplary embodiment, the holographic optical element may refract a path of the incident light with a refraction angle of about zero (0) degree.

In an exemplary embodiment, the first reflection unit may reflect the coherent light from the light source unit and incident thereto to advance in parallel to each other.

In an exemplary embodiment, the first reflection unit and the second reflection unit may constitute a part of sides of the backlight unit, an inlet part may be defined in a side of the backlight unit at a focal point of the parabolic mirror, and the light source unit may be disposed to allow the coherent light output therefrom to pass through the inlet part.

In an exemplary embodiment, the light source unit may include a plurality of single color light sources.

In an exemplary embodiment, the holographic optical element may change a path of a light from the plurality of single color light sources and incident thereto to be output with a refraction angle of about zero (0) degree.

According to an exemplary embodiment of the invention, a holographic display device includes: a light source unit which outputs coherent light; a first reflection unit including a parabolic mirror; a second reflection unit facing the first reflection unit and including a flat mirror; a holographic optical element which changes a path of incident light; and a holographic display which displays a pattern, where a reflection surface of the second reflection unit forms an acute angle with an light incident surface of the holographic optical element, and the coherent light output from the light source unit sequentially passes the first reflection unit, the second reflection unit, the holographic optical element, and the holographic display.

In an exemplary embodiment, the holographic optical element may refract the incident light in a way such that a refracted light from the holographic optical element is incident to the holographic display with an incident angle of about zero (0) degree.

In an exemplary embodiment, the light source unit may be positioned at a focal point of the parabolic mirror of the first reflection unit.

In an exemplary embodiment, the holographic display may display an interference pattern of an object.

In an exemplary embodiment, the first reflection unit may reflect the coherent light from the light source unit and incident thereto to advance in parallel to each other.

In an exemplary embodiment, the light source unit may include: a coherent light source; or an incoherent light source and a pinhole part positioned before an output part of the incoherent light source.

According to exemplary embodiments of the disclosure, a thickness of the backlight unit that provides a coherent surface light may be reduced, and a number of the holographic optical element included therein may be reduced, such that a manufacturing cost may be reduced and light efficiency may be improved. Accordingly, efficiency of the holographic display including the backlight unit may be improved, and a thickness thereof may be reduced.

BRIEF DESCRIPTION OF THE DRAWINGS

These and/or other features of the invention will become apparent and more readily appreciated from the following detailed description of embodiments thereof, taken in conjunction with the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

Accordingly, the drawings and description are to be regarded as illustrative in nature and not restrictive. Like reference numerals designate like elements throughout the specification.

In addition, the size and thickness of each configuration shown in the drawings are arbitrarily shown for better understanding and ease of description, and the invention is not limited thereto. In the drawings, the thickness of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Also, in the specification and drawing, a surface formed by a first direction DR1 and a second direction DR2 that perpendicularly cross each other or a view when observing a structure on a surface parallel thereto is referred to as "in a plan view". A surface formed by a third direction DR3 perpendicular to the surface formed by the first direction DR1 and the second direction DR2 and one direction of the first direction DR1 and the second direction DR2 or a view when observing a structure on a surface parallel thereto is referred to as "in a sectional view".

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

First, a backlight unit according to exemplary embodiment will be described with reference to FIG. 1 to FIG. 3.

Figure 1:
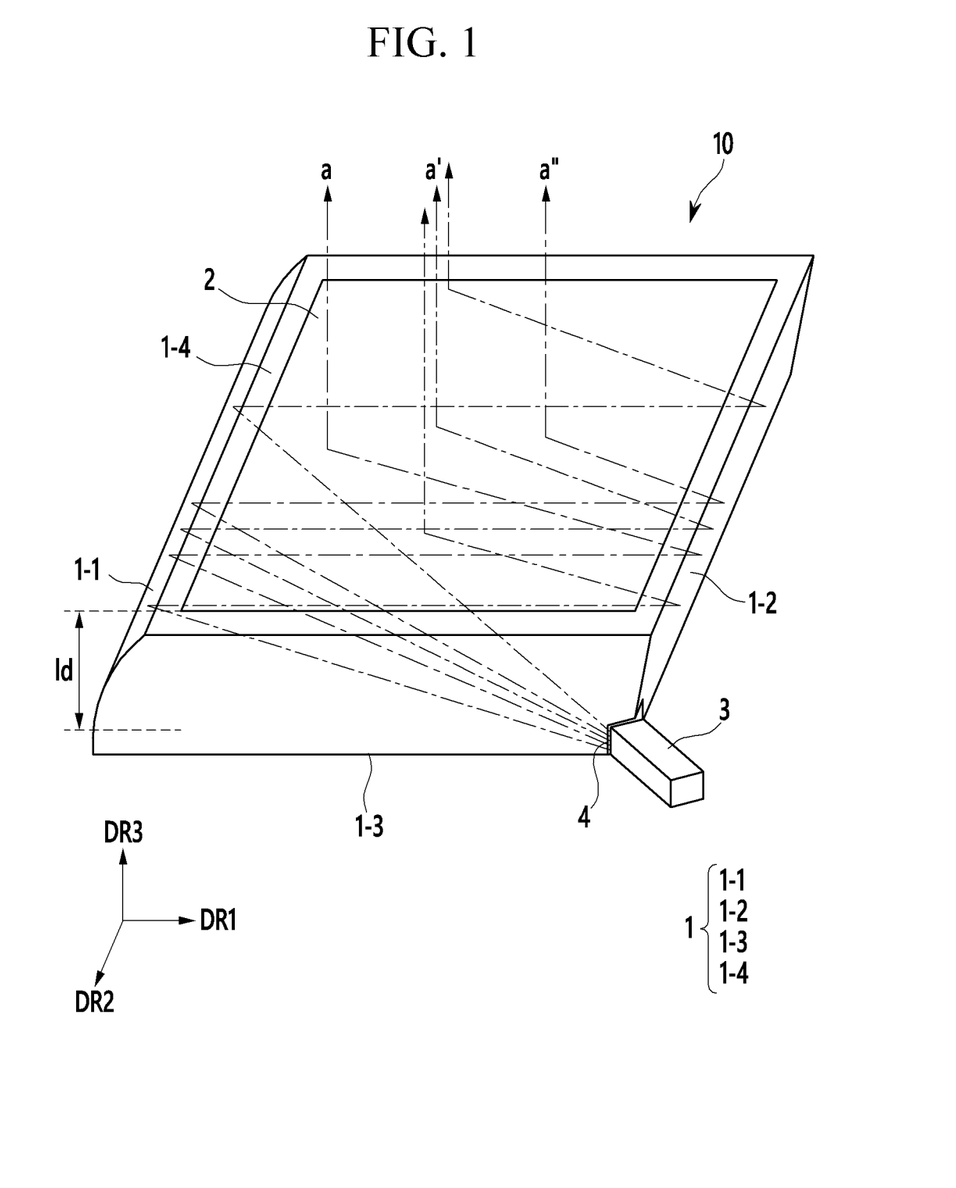
FIG. 1 is a perspective view schematically showing a backlight unit according to an exemplary embodiment.

FIG. 1 is a perspective view schematically showing a backlight unit according to an exemplary embodiment. FIG. 2 is a view showing a parabolic mirror according to an exemplary embodiment. FIG. 3 is a cross-sectional view of a backlight unit according to an exemplary embodiment.

Figure 3:
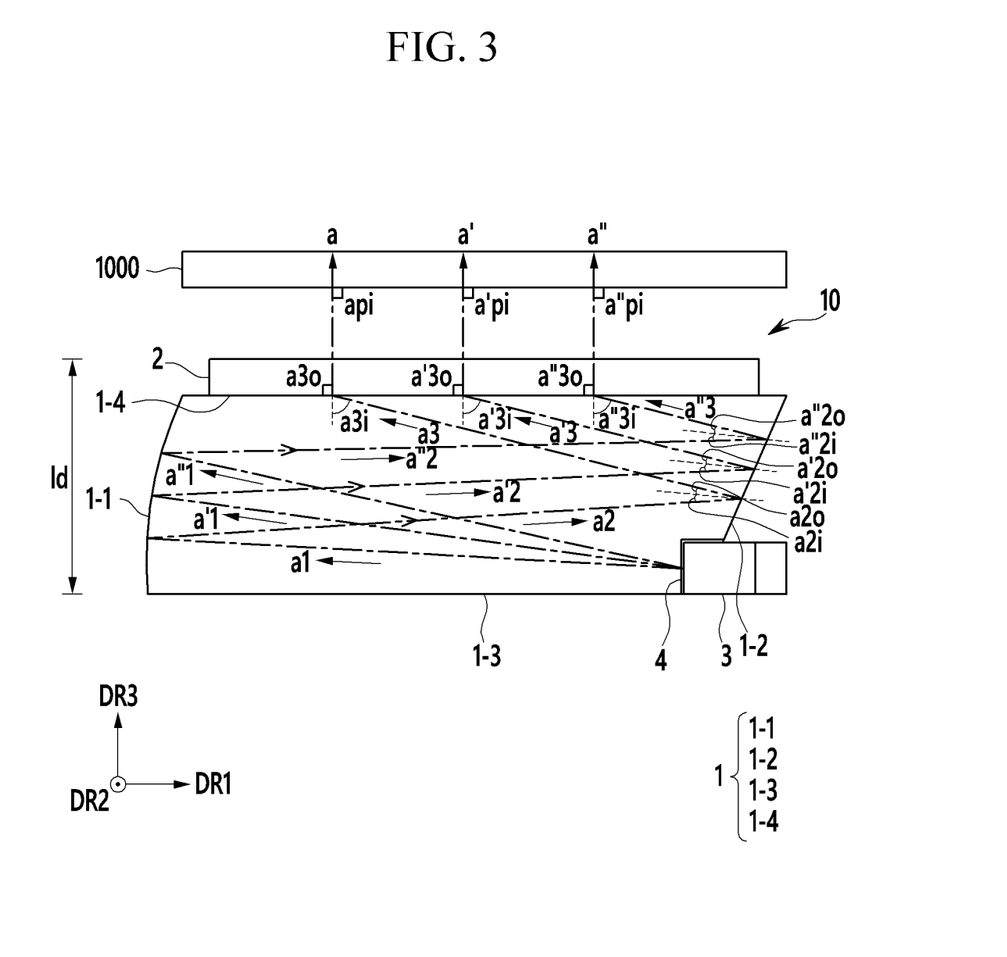
FIG. 3 is a cross-sectional view of a backlight unit according to an exemplary embodiment.

Particularly, FIG. 3 shows a shape of the backlight unit of FIG. 1 taken along a plane defined by the first direction DR1 and the third direction DR3.

First, referring to FIG. 1, an exemplary embodiment of the backlight unit 10 includes a frame 1, a holographic optical element 2, and a light source unit 3.

The frame 1 includes a first reflection unit 1-1 and a second reflection unit 1-2. The first reflection unit 1-1 and the second reflection unit 1-2 face each other and may constitute side portions of the frame 1. The frame 1 may further include a lower plate 1-3 and an upper plate 1-4.

The first reflection unit 1-1 may include a parabolic mirror. Light output from the light source unit 3 may be directly incident to the first reflection unit, and a surface of the first reflection unit 1-1 where the light output from the light source unit 3 is incident is concave. The parabolic mirror will be described later in detail.

The second reflection unit 1-2 may be positioned on the opposite side to the first reflection unit 1-1, and the light reflected from the first reflection unit 1-1 may be incident thereto. The second reflection unit 1-2 may include a flat mirror having a predetermined slope. The slope of the second reflection unit 1-2 is not limited to the predetermined slope. In one exemplary embodiment, for example, an angle formed by the light incident surface of the holographic optical element 2 and the reflection surface of the second reflection unit 1-2 may be an acute angle to make the light reflected from the second reflection unit 1-2 incident to the holographic optical element 2. The slope of the reflection surface of the second reflection unit 1-2 may be variously determined depending on whether the light reflected from the second reflection unit 1-2 is incident to the holographic optical element 2 at any incident angle.

In an exemplary embodiment, the frame 1, except for an inlet part 4 thereof, where the light output from the light source unit 3 is incident, is closed and sealed to limit a path of the light output from the light source unit 3, and the overall shape of the frame 1 may be an approximate hexahedral shape having six surfaces. An inside of the frame 1 may be filled with air or the like. According to an alternative exemplary embodiment, the frame 1 may be replaced with a transparent member (not shown), into which the light may proceed. In such an embodiment, the transparent member may include glass or the like.

A first reflection unit 1-1, A second reflection unit 1-2, another first reflection unit 1-1, and another second reflection unit 1-2 are connected, and two different surfaces facing each other may constitute the side surfaces of the frame 1, while the lower plate 1-3 and the upper plate 1-4, which may be flat and extending to be parallel to each other, may respectively constitute a lower surface and an upper surface. The lower plate 1-3 and the upper plate 1-4 have a surface extended in parallel to a plane defined by the first direction DR1 and the second direction DR2.

A holographic optical element 2 is positioned on the upper plate 1-4. The light reflected from the second reflection unit 1-2 may be incident to the holographic optical element 2. The holographic optical element 2 with a plate shape may be disposed to be parallel to the surface of the upper plate 1-4. According to an alternative exemplary embodiment, the upper plate 1-4 may be omitted, and the holographic optical element 2 may define the upper surface of the frame 1.

The holographic optical element 2, which is an optical element using a diffraction phenomenon of light, may modify or change the path of the light incident to be output while having a specific refraction angle for a specific incident angle of the light. That is, the light incident to the holographic optical element 2 with the specific incident angle is refracted with the specific refraction angle and proceeds while passing through the holographic optical element 2.

The incident angle is an angle of the light propagation direction for a tangent of the light incidence surface. Here, the specific incident angle means an incident angle at which the light reflected from the second reflection unit 1-2 is incident to the holographic optical element 2, and may be changed depending on a slope setting of the second reflection unit 1-2. The refraction angle is an angle formed by the emitted light for the tangent of the outputting light surface. The light passing through the holographic optical element 2 may be incident to a holographic display (not shown), and the specific refraction angle of light refracted from the holographic optical element 2 may be an angle to make the refracted and proceeding light be incident with an incident angle of about zero (0) degree to the holographic display.

In one exemplary embodiment, for example, where the plane of the holographic display is parallel to the plane of the holographic optical element 2 and the slope of the second reflection unit 1-2 is set for the light reflected from the second reflection unit 1-2 to be incident to the holographic optical element 2 with an incident angle of about 60 degrees, the holographic optical element 2 may be manufactured for the light incident with the incident angle of about 60 degrees to be refracted and proceed with the refraction angle of about zero (0) degree.

In an alternative exemplary embodiment, where the plane of the holographic display is disposed to be parallel to the plane of the holographic optical element 2, and the slope of the second reflection unit 1-2 is set for the light reflected from the second reflection unit 1-2 to be incident to the holographic optical element 2 with an incident angle of about 30 degrees, the holographic optical element 2 may be manufactured for the light incident with the incident angle of about 30 degrees to be refracted and proceed with the refraction angle of about 0 degree.

The value of such angle is merely exemplary, and may be variously set depending on the design of the backlight unit 10. The slope of the second reflection unit 1-2 and the position of the holographic display may be variously modified depending on the design of the backlight unit 10, thereby differentiating the specific incident angle and the specific refraction angle of the holographic optical element 2. In such an embodiment, the incident angle at which the light reflected from the second reflection unit 1-2 is incident to the holographic optical element 2 becomes the specific incident angle, and the refraction angle of the light refracted from the holographic optical element 2 to be incident to the holographic display at about zero (0) degree becomes the specific refraction angle.

The light source unit 3 may be positioned at a focal point of the parabolic mirror of the first reflection unit 1-1. The light source unit 3 may be positioned for the light output from the light source unit 3 to be incident through the side surface of the frame 1. In an exemplary embodiment, the inlet part 4, where the light output from the light source unit 3 is incident, may be positioned at a corner of the side of the frame 1. In such an embodiment, since the light output from the light source unit 3 is desired to be incident to the first reflection unit 1-1, the light source unit 3 may be positioned opposite the first reflection unit 1-1. In an exemplary embodiment, the light source unit 3 may be positioned within a distance Id between the lower plate 1-3 of the frame 1 and the holographic optical element 2.

The light source unit 3, as a substantially point light source, outputs coherent light of which the wavelength is constant and the phase is continuous. In an exemplary embodiment, the light source unit 3 may include a laser, a laser diode, or the like. In an exemplary embodiment, where the light source unit 3 includes the light emitting diode that outputs incoherent light, a pinhole is further included such that the output light becomes coherent light through the pinhole part. In such an embodiment, any light source that outputs incoherent light may be used as the light source unit 3, by converting the incoherent light into coherent light.

The light output from the source unit 3 may have spatial coherence such that the phase of the wave is aligned for a transverse direction that is perpendicular to the progressing direction of the light.

The light source unit 3 may include a white light source or a single color light source. In an exemplary embodiment, where the light source unit 3 includes the white light source, the holographic optical element 2 may be a holographic optical element 2 for a white light source. The holographic optical element 2 for the white light source will be described.

Next, the parabolic mirror PM and the first reflection unit 1-1 will be described in greater detail with reference to FIG. 2 and FIG. 3 as well as FIG. 1.

Figure 2:
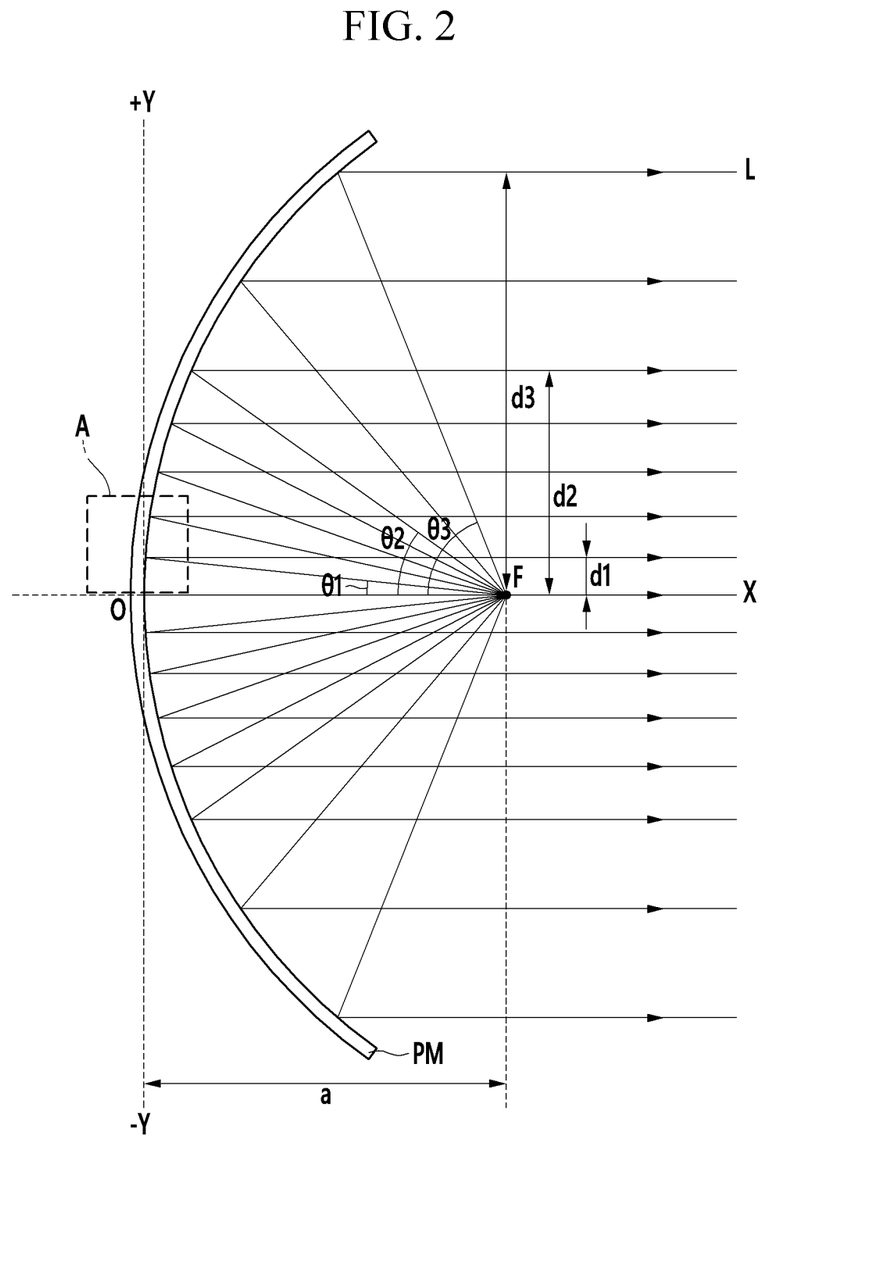
FIG. 2 is a view showing a parabolic mirror according to an exemplary embodiment.

Arrow lines L of FIG. 2 represent paths of the light. The parabolic mirror PM of the FIG. 2 is a condensing type of mirror, and the light L incident from the focal point F of the parabolic mirror PM to the parabolic mirror PM is reflected and progresses to be parallel to a line connecting the focal point F of the parabolic mirror PM and a center O of the parabolic mirror PM by a straight line. In contrast, the light progressing to be parallel to the line connecting the focal point F of the parabolic mirror PM and the center O of the parabolic mirror PM by the straight line and incident to the parabolic mirror PM is condensed to the focal point F of the parabolic mirror PM. In an exemplary embodiment, the light source is positioned at the focal point F to reflect and progress the light incident to the parabolic mirror PM to be parallel to the light connecting the focal point F of the parabolic mirror PM and the center O of the parabolic mirror PM by the straight line. The center O of the parabolic mirror PM is a position of the parabolic mirror PM when the light incident from the focal point F is again reflected to the focal point F, and a straight line of the focal point F of the parabolic mirror PM and the center O of the parabolic mirror PM becomes a focal length a. Coordinates (x, y) of each position of the parabolic mirror PM may be determined by the following Equation: $y^2 = 4 \times x$, in which 'y' denotes a y-coordinate value, 'x' denotes an x-coordinate value, and 'a' denotes the focal length.

When the position to be the focal point F of the parabolic mirror PM and the center O of the parabolic mirror PM are determined as a reference, and the line connecting the focal point F and the center O by the straight line is referred to as an X-axis, the focal length a, which is the distance from the center O of the parabolic mirror PM to the focal point F, is substituted into the Equation above such that the position on the XY plane of the parabolic mirror PM may be determined. When the focal length a is multiplied by four and the position on the X-axis of the parabolic mirror PM, it is the same as a value of the square to the position on the Y-axis. That is, a plurality of (x, y) coordinates as the position on the XY plane of the parabolic mirror PM may be obtained. If the XY plane passes the focal point F and is positioned around 180 degrees (for example) with respect to an axis parallel to the Y-axis, a semi-spherical parabolic mirror PM is formed.

At least part of the parabolic mirror PM may be used as the first reflection unit 1-1 of the backlight unit 10 of FIG. 3. If the entire parabolic mirror PM in which the line connecting the focal point F and the center of the parabolic mirror by the straight line accords with the X-axis passing the center O and the focal point F of the parabolic mirror PM is referred to as an on-axis parabolic mirror, a part of the on-axis parabolic mirror cut for the line connecting the focal point F and the center of the parabolic mirror by the straight line to be deviated from the X-axis passing the center O and the focal point F of the parabolic mirror PM is referred to as an off-axis parabolic mirror. In an exemplary embodiment, the first reflection unit 1-1 may include the off-axis parabolic mirror.

In one exemplary embodiment, for example, the first reflection unit 1-1 may include a first portion A of the parabolic mirror PM shown in FIG. 2. The first portion A may be a portion around of a center O of the parabolic mirror PM Angles θ1, θ2 and θ3 of the path of the light emitted from the light source positioned at the focal point F and incident to the parabolic mirror PM by the X-axis are relatively small near the center O of the parabolic mirror PM and are increased farther as being away from the center O of the parabolic mirror PM. As the angles θ1, θ2, and θ3 of the path of the light emitted from the light source positioned at the focal point F and incident to the parabolic mirror PM by the X-axis are increased, the distances d1, d2, and d3 between the path of the light reflected by the parabolic mirror PM to be progressed and the focal point F are increased. As the distances d1, d2 and d3 between the path of the light reflected by the parabolic mirror PM to be progressed and the focal point F in the Y-axis are increased, the thickness of the backlight unit 10 that includes the light source positioned at the focal point F are increased or becomes thicker. If the first region A of FIG. 2 is applied to the first reflection unit 1-1 of FIG. 3, the lower plate 1-3 may be positioned on the plane including the X-axis of the parabolic mirror PM of FIG. 2, and the light source unit 3 may be positioned at the focal point F of the parabolic mirror PM.

In an exemplary embodiment, as described above, the first reflection unit 1-1 includes the first portion A near the center O of the parabolic mirror PM, such that the light source unit 3 may be positioned for the output light to be incident at the side of the frame 1. In such an embodiment, since the light source unit 3 may be positioned within the distance Id between the lower plate 1-3 of the frame 1 and the holographic optical element 2, the thickness of the backlight unit 10 including the light source unit 3 may be the same as the distance Id between the lower plate 1-3 and the holographic optical element 2, and the entire thickness of the backlight unit 10 is thereby substantially reduced.

Next, paths a, a', a" of the light in the backlight unit 10 will be described with reference to FIG. 3.

The light source unit 3 may be positioned at the focal point of the parabolic mirror of the first reflection unit 1-1. The light output from the light source unit 3 is incident to the first reflection unit 1-1. For convenience of description, the light output from the light source unit 3 is represented by the three paths a, a', and a". The holographic display 1000 may be positioned before the surface where the light passes in the holographic optical element 2, and the light incident surface of the holographic display 100 may be disposed to be parallel to the light emission surface of the holographic optical element 2.

The light a of a first path output from the light source unit 3 progresses in a first first direction a1 and may be incident to the first reflection unit 1-1 to be reflected in a first second direction a2 to the second reflection unit 1-2. The light reflected in the first second direction a2 may be incident to the second reflection unit 1-2 with a first second incident angle a2i. The light incident to the second reflection unit 1-2 with the first second incident angle a2i is reflected with the first second reflection angle a2o, and the first second incident angle a2i and the first second reflection angle a2o have a same value as each other by a nature of the light. The light reflected from the second reflection unit 1-2 with the first second reflection angle a2o advances in a first third direction a3 and may be incident to the holographic optical element 2 with a first third incident angle a3i. The light incident to the holographic optical element 2 with the first third incident angle a3i may be refracted and advanced with the refraction angle of about zero (0) degree by the holographic optical element 2. A first third complementary angle a3o as an angle of which the refraction angle is subtracted from 90 degrees may be about 90 degrees, and the light refracted from the holographic optical element 2 with the refraction angle of zero (0) degree to be advanced may be incident to the holographic display 1000 with the incident angle of zero (0) degree. A first fourth complementary angle api of which the incident angle incident to the holographic display 1000 is subtracted from 90 degrees may be about 90 degrees. That is, the light passing the holographic optical element 2 may be incident in a direction vertical to the surface of the holographic display 1000.

The light a' of a second path output from the light source unit 3 advances in a second first direction a'1 and is incident to the first reflection unit 1-1 to be reflected in a second second direction a'2. The light reflected in the second second direction a'2 may be incident to the second reflection unit 1-2 with the second second incident angle a'2i. The light incident to the second reflection unit 1-2 with the second second incident angle a'2i is reflected with a second second reflection angle a'2o, and the second second incident angle a'2i and the second second reflection angle a'2o have a same value as each other by the nature of the light. The light reflected from the second reflection unit 1-2 with the second second reflection angle a'2o may advance in a second third direction a'3 to be incident to the holographic optical element 2 with a second third incident angle a'3i. The light incident to the holographic optical element 2 with the second third incident angle a'3i may be reflected by the holographic optical element 2 with the refraction angle of about zero (0) degree to be advanced. A second third complementary angle a'3o as an angle of which the refraction angle is subtracted from 90 degrees is about 90 degrees, and the light refracted from the holographic optical element 2 with the refraction angle of zero (0) degree to be advanced may be incident to the holographic display 1000 with the incident angle of zero (0) degree. A second fourth complementary angle a'pi as an angle of which the incident angle incident to the holographic display 1000 is subtracted from 90 degrees may be about 90 degrees. That is, the light passing the holographic optical element 2 may be incident in the direction perpendicular to the surface of the holographic display 1000.

The light a" of a third path output from the light source unit 3 may advance in a third first direction a"1 and may be incident to the first reflection unit 1-1 to be reflected in a third second direction a"2. The light reflected in the 3-2 direction may be incident to the second reflection unit 1-2 with the third second incident angle a"2i. The incident to the second reflection unit 1-2 with the third second incident angle a"2i is reflected with a third second reflection angle a"2o, and the third second incident angle a"2i and the third second reflection angle a"2o have a same value as each other by the natural of the light. The light reflected from the second reflection unit 1-2 with the third second reflection angle a"2o advances in a third third direction a"3 to be incident to the holographic optical element 2 with a third third incident angle a"3i. The light incident to the holographic optical element 2 with the third third incident angle a"3i may be refracted and advanced at the refraction angle of about zero (0) degree by the holographic optical element 2. A third-third complementary angle a"3o as an angle of which the refraction angle is subtracted from 90 degrees is about 90 degrees, and the light that is refracted from the holographic optical element 2 and advances with the refraction angle of zero (0) degree may be incident to the holographic display 1000 with the incident angle of 0 degree. A third-fourth complementary angle a"pi as an angle of which the incident angle incident to the holographic display 1000 is subtracted from 90 degrees may be about 90 degrees. That is, the light passing the holographic optical element 2 may be incident in the direction perpendicular to the surface of the holographic display 1000.

In an exemplary embodiment, the light output from the light source unit 3 positioned at the focal point of the parabolic mirror is reflected to be parallel regardless of whether the light is incident to the first reflection unit 1-1 with any paths a, a', and a" based on the characteristics of the parabolic mirror of the first reflection unit 1-1. In such an embodiment, the first second direction a2 at which the light a of the first path incident to the first reflection unit 1-1 in the first first direction a1 is reflected and advances, the second second direction a'2 at which the light a' of the second path incident to the first reflection unit 1-1 in the second first direction a'1 is reflected and advances, and the third second direction a"2 at which the light a" of the third path incident to the first reflection unit 1-1 in the third first direction a"1 is reflected and advances are parallel to each other.

In such an embodiment, since the light a of the first path, the light a' of the second path, and the light a" of the third path advance in the first second direction a2, the second second direction a'2, and the third second direction a"2 that are parallel to each other and are incident to the second reflection unit 1-2, the first second incident angle a2i, the second second incident angle a'2i, and the third second incident angle a"2i incident to the second reflection unit 1-2 may be the same as each other. By the natural of the light, if the first second incident angle a2i, the second second incident angle a'2i, and the third second incident angle a"2i are equal to each other, the first second reflection angle a2o, the second second reflection angle a'2o, and the third second reflection angle a"2o are equal to each other.

If the first second reflection angle a2o, the second second reflection angle a'2o, and the third second reflection angle a"2o are equal to each other, the first third direction a3, the second third direction a'3, and the third third direction a"3 as the direction in which the light is reflected from the second reflection unit 1-2 and advances to the holographic optical element 2 may also be parallel to each other.

If the second third direction a'3 and the third third direction a"3 as the direction, in which the light is reflected from the second reflection unit 1-2 and advances, are parallel to each other, the first third incident angle a3i, the second third incident angle a'3i, and the third third incident angle a"3i as the incident angle incident to the holographic optical element 2 are the same as each other.

In such an embodiment, the holographic optical element 2 may be modified or changed to allow the light incident thereto in the first third incident angle a3i, the second third incident angle a'3*i*, and the third third incident angle a"3*i* to be refractive at the same as each other or at about zero (0) degree. Accordingly, the first third complementary angle a3*o*, the second third complementary angle a'3*o*, and the third third complementary angle a"3*o* of the light a of the first path, the light a' of the second path, and the light a" of the third path by the surface of the holographic optical element 2 may all be about 90 degrees.

The light a of the first path, the light a' of the second path, and the light a" of the third path that are refracted with the refraction angle of about zero (0) degree from the holographic optical element 2 and advance proceed to be parallel to each other, thereby being incident to the holographic display 1000 with the incident angle of about 0 degree. Accordingly, the first fourth complementary angle a*pi*, the second fourth complementary angle a'*pi*, and the third fourth complementary angle a*pi* as the angle of the light a of the first path, the light a' of the second path, and the light a" of the third path by the surface of the holographic display 1000 may all be about 90 degrees.

As described above, according to an exemplary embodiment, the light output from the light source unit 3 including the point light source is converted into the surface light source through a single holographic optical element 2 and is incident to the holographic display 1000. Accordingly, compared with a conventional holographic display device using a plurality of holographic optical elements, manufacturing cost of the backlight unit 10 may be reduced and the light output from the light source unit 3 may be minimized from being lost in the backlight unit 10. The light output from the light source unit 3 may be incident to the holographic display 1000 with high efficiency through a single holographic optical element 2.

In such an embodiment, by using the parabolic mirror, particularly, the off-axis parabolic mirror, near the center of the on-axis parabolic mirror as the first reflection unit 1-1, the light source unit 3 may be positioned at a side of the frame 1 to make the light incident to the side of the frame 1. In such an embodiment, as the light source unit 3 may be positioned within a distance Id between the lower plate 1-3 of the frame 1 and the holographic optical element 2, the entire thickness of the backlight unit 10 including the light source unit 3 may be equal to the distance Id between the lower plate 1-3 and the holographic optical element 2. Accordingly, compared with a conventional holographic display device in which the light source unit 3 may be positioned outside the distance Id between the lower plate 1-3 of the frame 1 and the holographic optical element 2, the entire thickness of the backlight unit 10 may be reduced.

Figure 4:
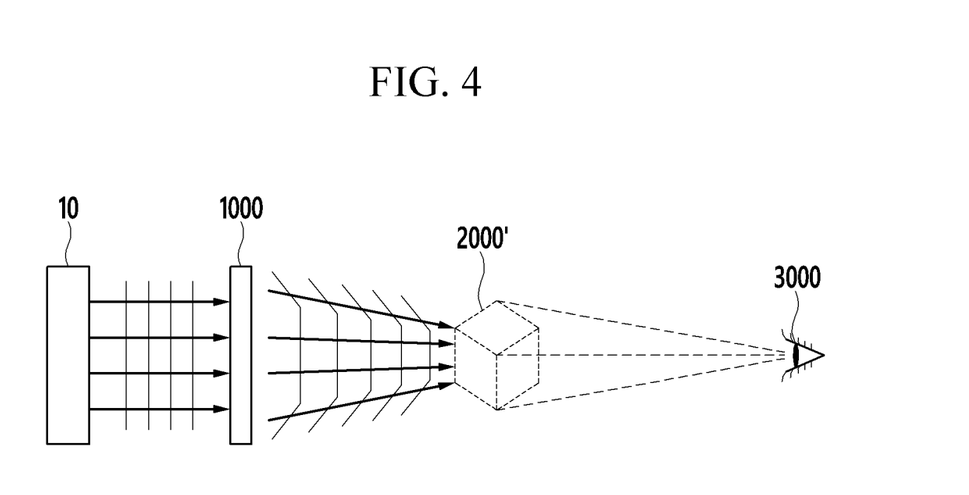
FIG. 4 is a view schematically showing an exemplary embodiment of a method of reproducing a three-dimensional ("3D") image through a holographic display device.

Next, the holographic display device including the backlight unit according to an exemplary embodiment will be described with reference to FIG. 4. The description for the same or like configurations as in the above-described exemplary embodiments will hereinafter be omitted or simplified. FIG. 4 is a view schematically showing an exemplary embodiment of a method of reproducing a three-dimensional ("3D") image through a holographic display device.

An exemplary embodiment of the holographic display device includes a backlight unit 10 and a holographic display 1000.

The backlight unit 10 outputs coherent light to be provided to the holographic display 1000.

The holographic display 1000 may be realized by an analog or digital method. In one exemplary embodiment, for example, the holographic display 1000 may be a plate or a film in which information of the 3D image is recorded, or a digital holographic display in which an object to be realized with the 3D image is formed with an interference pattern through a mathematic calculation and processing to be recorded as data and a pattern for the interference pattern is displayed. Hereinafter, for convenience of description, an exemplary embodiment where the holographic display 1000 is the digital holographic display is mainly described.

In an exemplary embodiment, each pixel of the holographic display 1000 modulates the light incident to the holographic display 1000 to be divided into a plurality of light lines and may change a direction thereof. By diffracting the light and varying the intensity thereof by using the pattern floated on the holographic display 1000 panel, a 3D image 2000' may be realized by meeting and making the desired light lines on the specific space interfere with each other.

A viewer 3000 observes an imaginary 3D image 2000', thereby recognizing a stereoscopic image.

In an exemplary embodiment, as described above, the holographic display device may be the digital holographic display device including the backlight unit, but the scope of the invention is not limited thereto. The exemplary embodiments of the backlight unit described herein may be applied to a device capable of realizing the 3D image using a coherent backlight unit.

Figure 5:
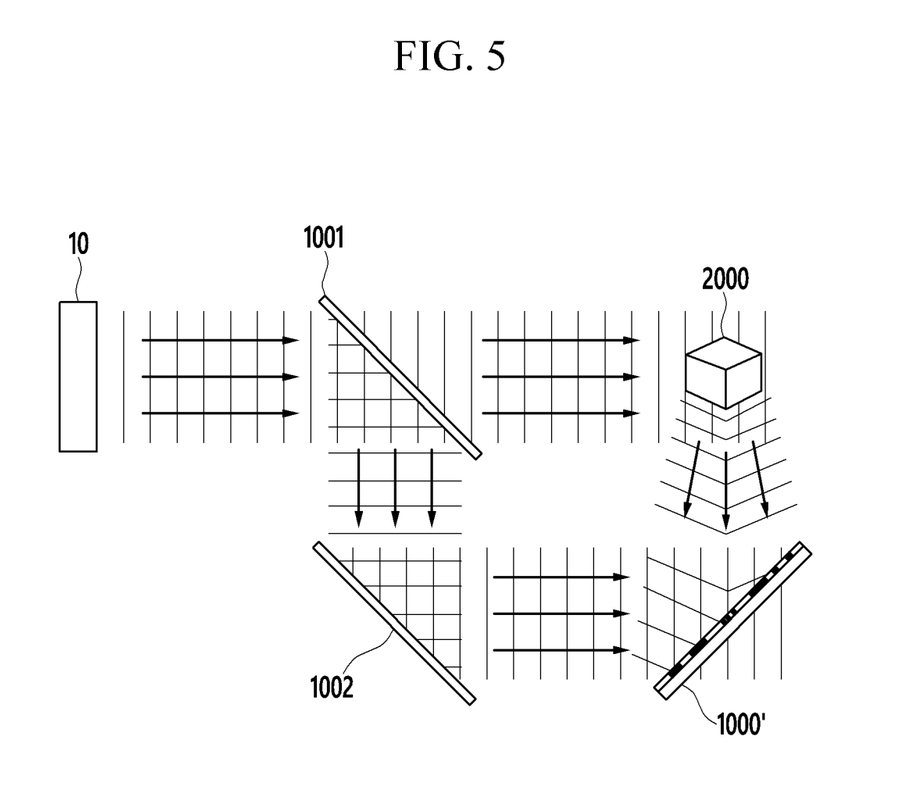
FIG. 5 is a view schematically showing an exemplary embodiment of a hologram recording method of an analog method.

Next, a method of forming a holographic plate as the holographic display of an analog method using the backlight unit according to an exemplary embodiment will be described with reference to FIG. 5. The description for the same or like configurations as in the above-described exemplary embodiment will hereinafter be omitted or simplified. FIG. 5 is a view schematically showing an exemplary embodiment of a hologram recording method of an analog method.

Ab exemplary embodiment of the backlight unit 10 may be applied to a method of forming an analog holographic plate 1000'. The backlight unit 10 outputs the coherent light and such coherent light is divided into straight light and refracted light by a beam splitter 1001. The straight light in the beam splitter 1001 is reflected and diffracted by an object 2000 to be realized as the 3D image and then is incident to the holographic plate 1000', and the refracted light in the beam splitter 1001 is reflected by a mirror 1002 to be incident to the holographic plate 1000'. An object wave that is reflected or diffracted from the object 2000 and a reference wave as another coherent wave reflected from the mirror 1002 interfere in the holographic plate 1000', thereby forming an interference pattern in the holographic plate 1000'. An amplitude and phase information related to the object 2000 are recorded together in the interference pattern recorded in the holographic plate 1000'.

Such an embodiment of the backlight unit 10 provides the coherent light to the above-formed analog holographic plate 1000' as well as the forming method of the analog holographic plate 1000', thereby being applied to the method of reproducing the 3D image.

Figure 6:
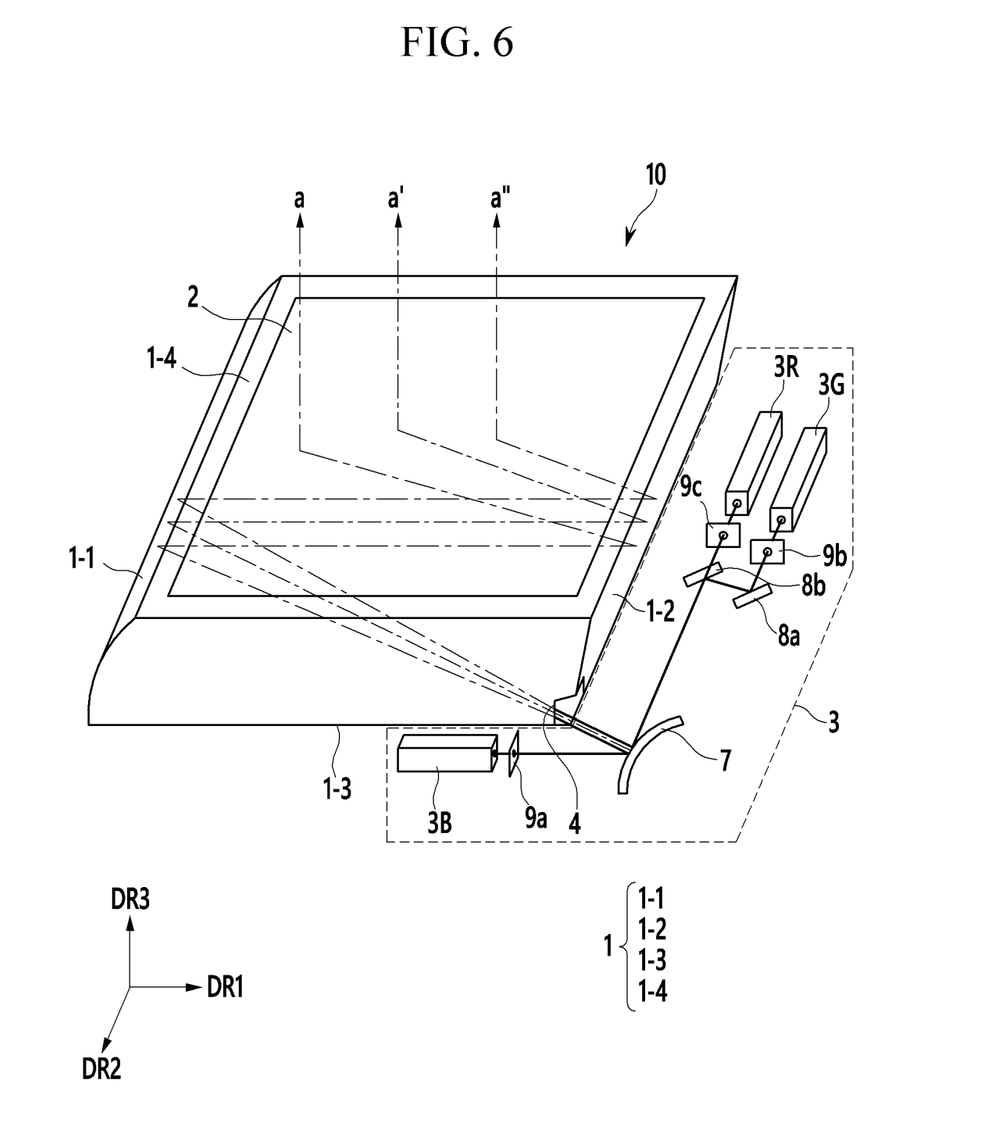
FIG. 6 is a view schematically showing a backlight unit according to an alternative exemplary embodiment.

Next, the backlight unit according to an alternative exemplary embodiment will be described with reference to FIG. 6. The description of the same or like configurations as in the above-described exemplary embodiment will hereinafter be omitted or simplified. FIG. 6 is a view schematically showing a backlight unit according to an alternative exemplary embodiment.

The light source unit 3 of the backlight unit 10 may include three single color light sources 3R, 3G and 3B. In one exemplary embodiment, for example, the first single color light source 3R may be a red light source, the second single color light source 3G may be a green light source, and the third single color light source 3B may be a blue light source. However, a color of the light source is not limited thereto, and a light source of other colors may be provided, and three or more light sources may be included in alternative exemplary embodiments. The three single color light sources 3R, 3G, and 3B may each be a single color light source of a different color, respectively, and may use a filter of the different colors to make a white light source. The three single color light sources 3R, 3G and 3B may be disposed for the light to be incident from the inlet part 4 positioned at the side of the frame 1 to the inside of the frame 1. The three single color light sources 3R, 3G, and 3B may all be positioned within the distance Id between the lower plate 1-3 of the frame 1 and the holographic optical element 2.

The light source unit 3 may further include a mirror to control the path of the light to make the light output from the three single color light sources 3R, 3G, and 3B incident to the inside of the frame 1 from the inlet part 4 positioned at the side of the frame 1.

The light output from the first single color light source 3R and the second single color light source 3G is combined into one path by a reflection mirror 8a and a transflective mirror 8b to be incident to a convex mirror 7. The light emitted from the first single color light source 3R, the second single color light source 3G, and the third single color light source 3B is refracted by the convex mirror 7 to be incident to the inlet part 4. The inlet part 4 may be positioned at the focal point of the parabolic mirror of the first reflection unit 1-1.

The reflection mirror 8a and the transflective mirror 8b to combine the paths of the light output from the first single color light source 3R and the second single color light source 3G into a single path are not limited to those shown in FIG. 6. Alternatively, at least some mirror among the reflection mirror 8a and the transflective mirror 8b may be omitted and another mirror may be added. According to another alternative exemplary embodiment, mirrors (not shown) may be disposed to combine the light output from the first single color light source 3R, the second single color light source 3G, and the third single color light source 3B into a single path.

The convex mirror 7 for modifying or changing the path of the light output from the first single color light source 3R, the second single color light source 3G, and the third single color light source 3B to be incident to the inlet part 4 may be a mirror of another type that is not a convex mirror such as one having a flat shape if the light output from the first single color light source 3R, the second single color light source 3G, and the third single color light source 3B is incident to the inlet part 4, and some mirror may be positioned or the convex mirror may be positioned at another position.

The light source unit 3 of the backlight unit 10 may further include pinhole parts 9a, 9b, and 9c having a fine hole. Three pinhole parts 9a, 9b, and 9c may be respectively positioned before parts where the light of the three single color light sources 3R, 3G, and 3B is output. When the three single color light sources 3R, 3G, and 3B are incoherent light sources, the pinhole parts 9a, 9b, and 9c pass the incoherent light through the pinhole part to make coherent light. If the three single color light sources 3R, 3G, and 3B are coherent light sources, at least one among the pinhole parts 9a, 9b, and 9c may be omitted.

In an exemplary embodiment, where the light source unit 3 includes a red first single color light source 3R, a green second single color light source 3G and a blue third single color light source 3B, the holographic optical element 2 may include a holographic optical element for a white light source. If a general holographic optical element for the single color light source includes a function of refracting the light with a specific refraction angle if one single color light is incident with a specific incident angle, the holographic optical element for the white light source is the holographic optical element including the function of refracting all the light with the specific incident angle if the light is incident with the specific refraction angle for each wavelength band of the plurality of single color light sources 3R, 3G, and 3B. In such an embodiment, where the holographic optical element 2 includes the holographic optical element for the white light source, the light of a red wavelength band output from the first single color light source 3R, the light of a green wavelength band output from the second single color light source 3G, or the light of a blue wavelength band output from the third single color light source 3B is incident with a specific incident angle, the holographic optical element 2 may refract the light with the same specific refraction angle. The holographic optical element 2 may modify or change the path of the light of the red wavelength band output from the first single color light source 3R, the light of the green wavelength band output from the second single color light source 3G, or the light of the blue wavelength band output from the third single color light source 3B to be incident to the holographic display at about 0 degree.

Figure 7:
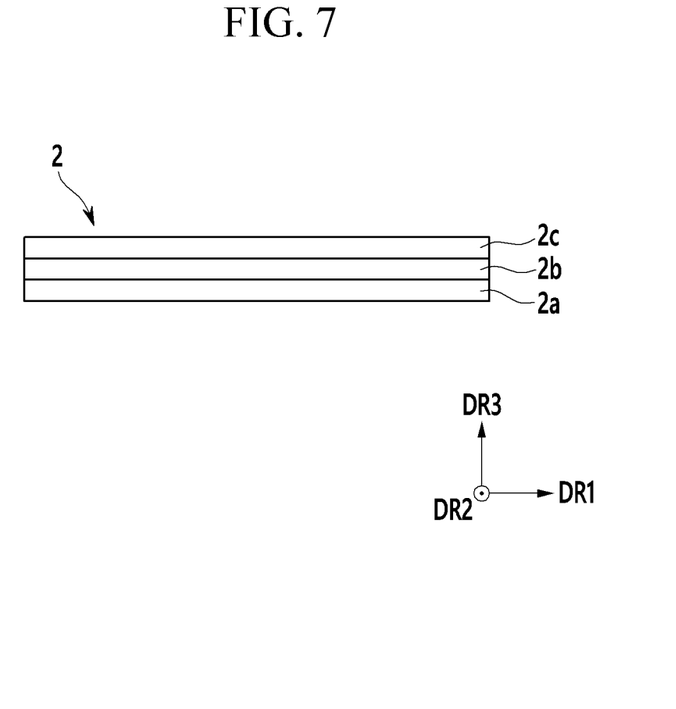
FIG. 7 is a cross-sectional view of a holographic optical element according to an alternative exemplary embodiment.

The holographic optical element for the white light source may be a type in which the plurality of holographic optical elements respectively functioning as the first single color light source 3R, the second single color light source 3G, and the third single color light source 3B are disposed to overlap each other. Referring to FIG. 7 showing a schematic cross-sectional view of the holographic optical element according to an exemplary embodiment, when the holographic optical element 2 is the holographic optical element for the white light source, the holographic optical element 2 may be a type in which three holographic optical elements of a holographic optical element 2a for the first single color light source 3R, a holographic optical element 2b for the second single color light source 3G, and a holographic optical element 2c for the third single color light source 3B are stacked one on another. The holographic optical element 2a for the first single color light source 3R may have the function of refracting the light a the specific refraction angle when the light of the red wavelength band output from the first single color light source 3R is incident with the specific incident angle, the holographic optical element 2b for the second single color light source 3G may have the function of refracting the light with a specific refraction angle when the light of the green wavelength band output from the second single color light source 3G is incident with the specific incident angle, and the holographic optical element 2c for the third single color light source 3B may have the function of refracting the light with a specific refraction angle when the light of the blue wavelength band output from the third single color light source 3B is incident with the specific incident angle.

Alternatively, the holographic optical element for the white light source may have a single layer shape in which the functions of the first single color light source 3R, the second single color light source 3G, and the third single color light source 3B are overlapped and recorded to a single holographic optical element.

While the invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A backlight unit comprising:
a light source unit which outputs coherent light;
a frame including:
  a first reflection unit comprising an off-axis parabolic mirror;
  a second reflection unit facing the first reflection unit and comprising a flat mirror;
  two side portions connecting the first reflection unit and the second reflection unit; and
  a lower plate and an upper plate opposing each other; and
a holographic optical element which changes a path of incident light,
wherein a reflection surface of the second reflection unit directly meets a light incident surface of the holographic optical element to form an acute angle with each other,
the coherent light output from the light source unit sequentially passes the first reflection unit, the second reflection unit, and the holographic optical element, and
the light source unit is at a corner of the frame where the second reflection unit, the lower plate and one side portion of the two side portions meet each other.

2. The backlight unit of claim 1, wherein
the light source unit is positioned at a focal point of the off-axis parabolic mirror of the first reflection unit.

3. The backlight unit of claim 2, wherein the light source unit comprises:
a coherent light source; or
an incoherent light source, and a pinhole part positioned before an output part of the incoherent light source.

4. The backlight unit of claim 3, wherein
the incoherent light source includes a light emitting diode.

5. The backlight unit of claim 3, wherein
the holographic optical element refracts the incident light with a refraction angle of about zero degree.

6. The backlight unit of claim 3, wherein
the first reflection unit reflects the coherent light from the light source unit and incident thereto to advance in parallel to each other.

7. The backlight unit of claim 1, wherein
the first reflection unit and the second reflection unit constitute a part of sides of the backlight unit,
an inlet part is defined in a side of the backlight unit at a focal point of the off-axis parabolic mirror, and
the light source unit is disposed to allow the coherent light output therefrom to pass through the inlet part.

8. The backlight unit of claim 7, wherein
the light source unit comprises a plurality of single color light sources.

9. The backlight unit of claim 8, wherein
the holographic optical element changes a path of a light from the plurality of single color light sources and incident thereto to be output with a refraction angle of about zero degree.

10. A holographic display device comprising:
a light source unit which outputs coherent light;
a frame including:
  a first reflection unit comprising an off-axis parabolic mirror;
  a second reflection unit facing the first reflection unit and comprising a flat mirror;
  two side portions connecting the first reflection unit and the second reflection unit; and
  a lower plate and an upper plate opposing each other;
a holographic optical element which changes a path of incident light; and
a holographic display which displays a pattern,
wherein a reflection surface of the second reflection unit directly meets a light incident surface of the holographic optical element to form an acute angle with each other,
the coherent light output from the light source unit sequentially passes the first reflection unit, the second reflection unit, the holographic optical element, and the holographic display, and
the light source unit is at a corner of the frame where the second reflection unit, the lower plate and one side portion of the two side portions meet each other.

11. The holographic display device of claim 10, wherein
the holographic optical element refracts the incident light in a way such that a refracted light from the holographic optical element is incident to the holographic display with an incident angle of about zero degree.

12. The holographic display device of claim 11, wherein
the light source unit is positioned at a focal point of the off-axis parabolic mirror of the first reflection unit.

13. The holographic display device of claim 12, wherein
the holographic display displays an interference pattern of an object.

14. The holographic display device of claim 13, wherein
the first reflection unit reflects the coherent light from the light source unit and incident thereto to advance in parallel to each other.

15. The holographic display device of claim 14, wherein
the light source unit comprises:
a coherent light source; or
an incoherent light source, and a pinhole part positioned before an output part of the incoherent light source.

* * * * *